US009815628B2

United States Patent
Lotz et al.

(10) Patent No.: US 9,815,628 B2
(45) Date of Patent: Nov. 14, 2017

(54) CONVEYOR BELT HAVING A TENSILE MEMBER COMPRISING CABLES

(71) Applicant: ContiTech Transportbandsysteme GmbH, Hannover (DE)

(72) Inventors: Florian Lotz, Brevörde (DE); Marius Dreier, Katlenburg (DE); Uwe Sickmüller, Uhlstedt-Kirch (DE)

(73) Assignee: ContiTech Transportbandsysteme GmbH, Hannover (DE)

( * ) Notice: Subject to any disclaimer, the term of this patent is extended or adjusted under 35 U.S.C. 154(b) by 0 days.

(21) Appl. No.: 14/916,575

(22) PCT Filed: Jul. 9, 2014

(86) PCT No.: PCT/EP2014/064665
§ 371 (c)(1),
(2) Date: Mar. 4, 2016

(87) PCT Pub. No.: WO2015/032528
PCT Pub. Date: Mar. 12, 2015

(65) Prior Publication Data
US 2016/0200518 A1      Jul. 14, 2016

Related U.S. Application Data

(63) Continuation of application No. PCT/EP2014/064665, filed on Jul. 9, 2014.

(30) Foreign Application Priority Data

Sep. 6, 2013 (DE) .......................... 10 2013 109 770
Feb. 27, 2014 (DE) .......................... 10 2014 203 595

(51) Int. Cl.
*B65G 15/36*     (2006.01)
*B29D 29/06*     (2006.01)
(Continued)

(52) U.S. Cl.
CPC .............. *B65G 15/36* (2013.01); *B29D 29/06* (2013.01); *D07B 1/0613* (2013.01);
(Continued)

(58) Field of Classification Search
CPC ........ B65G 15/36; B29D 29/06; B29B 15/12; D07B 1/165; F16G 1/14
(Continued)

(56) References Cited

U.S. PATENT DOCUMENTS 3,998,986 A * 12/1976 Williams .................. B32B 5/06
156/148
5,308,725 A * 5/1994 Yu ........................ G03G 15/754
198/845

(Continued)

FOREIGN PATENT DOCUMENTS

GB      1089766 A    11/1967
GB      2026940 A    2/1980

OTHER PUBLICATIONS

AU Office Action dated Jun. 26, 2017 of the corresponding PCT/EP2014/064665.

*Primary Examiner* — Leslie A Nicholson, III
*Assistant Examiner* — Lester Rushin
(74) *Attorney, Agent, or Firm* — David L. Cate

(57) ABSTRACT

A conveyor belt includes a first outer sheet disposed on a loadbearing side of the conveyor belt, a second outer sheet disposed on a drive side of the conveyor belt, and an embedded tension-member system disposed between the two sides, which is in the form of cords running parallel in the longitudinal direction of the conveyor belt. The tension-member system includes steel and, prior to vulcanization of the conveyor belt, an expandable coating which, after vulcanization of the conveyor belt, has a pore structure provided to at least portions of the tension-member system. The (Continued)

sheets are formed from a polymeric material with resilient properties. In some aspects, the volume of the coating after vulcanization is from 30 to 5000% higher than prior to vulcanization. The coating may contain at least one of a blowing agent and/or microbeads.

6 Claims, 1 Drawing Sheet

(51) Int. Cl.
    *B29B 15/12*     (2006.01)
    *F16G 1/14*     (2006.01)
    *D07B 1/06*     (2006.01)
    *D07B 1/16*     (2006.01)

(52) U.S. Cl.
    CPC ........... *D07B 1/0686* (2013.01); *D07B 1/165* (2013.01); *D07B 1/0633* (2013.01); *D07B 2201/2046* (2013.01); *D07B 2201/2054* (2013.01); *D07B 2201/2062* (2013.01); *D07B 2201/2081* (2013.01); *D07B 2201/2082* (2013.01); *D07B 2501/2076* (2013.01)

(58) Field of Classification Search
    USPC ....................................... 198/844, 847, 844.1
    See application file for complete search history.

(56) References Cited

U.S. PATENT DOCUMENTS

| | | | |
|---|---|---|---|
| 7,514,628 B2 * | 4/2009 | Kadrnoska | F16L 3/223 174/24 |
| 2012/0043186 A1 * | 2/2012 | Trieb | B65G 15/36 198/847 |

* cited by examiner

CONVEYOR BELT HAVING A TENSILE MEMBER COMPRISING CABLES

CROSS REFERENCE TO RELATED APPLICATIONS

This application is a continuation application of international patent application PCT/EP2014/064665, filed Jul. 9, 2014, designating the United States and claiming priority from German application 10 2013 109 770.7, filed Sep. 6, 2013, and German application 2014 203 595.3, filed Feb. 27, 2014, and the entire content of these applications is incorporated herein by reference.

FIELD OF THE INVENTION

The invention relates to a conveyor belt with an outer sheet on the loadbearing side and on the drive side, the respective sheet being composed of a polymeric material with resilient properties, and also an embedded tension-member system in the form of cords, in essence composed of steel, running parallel in the longitudinal direction of the conveyor belt.

BACKGROUND

This section provides background information to facilitate a better understanding of the various aspects of the disclosure. It should be understood that the statements in this section of this document are to be read in this light, and not as admissions of prior art.

Conveyor belts have at least one carcass, which transmits tensile force and is made of textile and/or steel-cord inserts, generally surrounded by at least one adhesive rubber mixture. Surrounding the carcasses on all sides there are wear-resistant outer rubber sheets and a rubber edge-protection system. There can also, if required, be various arrangements present to prevent any kind of penetration.

Conveyor belts where the carcass consists essentially of steel cords are known as steel-cord conveyor belts. Steel-cord conveyor belts can provide excellent transport performance even under very adverse conditions. Their robust structure guarantees both high breaking strength when very high levels of conveying performance are required and also good resistance to harsh treatment. They are generally particularly abrasion-resistant, rot-resistant, and corrosion-resistant, and resistant to chemicals and to heat, thus ensuring a long lifetime with little need for maintenance.

The arrangement of the steel cords in the steel-cord conveyor belt mostly takes the form of layer in a plane between the outer sheets. For reasons related to adhesion and to prevention of corrosion, the steel cords are often galvanized cords, mostly with diameter from 2.8 to 16.0 mm, and can be composed of about 40 up to 250 individual wires.

In order to improve adhesion, adhesive mixtures, also known as adhesive rubber mixtures, are often also used, intended not only to optimize adhesion but also to flow into the steel cords during the vulcanization process in order to allow better sealing. Full penetration through the entire cord, also known as full rubberization, is essential for the lifetime of the steel cord and therefore also for the entire conveyor belt. If full rubberization does not take place, cavities in the cord structure remain available, and it is thus possible that, by way of example, liquids such as water, oils, etc. can migrate within the cord, and progressive oxidation processes, in particular corrosion, can occur, with increased aging and premature failure of the entire conveyor belt. Full penetration of the entire cord structure becomes more difficult as the diameter of the cord increases. In "closed" cord structures, which are also known as parallel-lay or lang-lay structures it is almost impossible to achieve full penetration even with relatively small diameters.

SUMMARY

This section provides a general summary of the disclosure, and is not a necessarily a comprehensive disclosure of its full scope or all of its features.

In a first embodiment of the disclosure, a conveyor belt is provided which includes a first outer sheet disposed on a loadbearing side of the conveyor belt, a second outer sheet disposed on a drive side of the conveyor belt, and an embedded tension-member system disposed between the two sides, which is in the form of cords running parallel in the longitudinal direction of the conveyor belt. The tension-member system includes steel and, prior to vulcanization of the conveyor belt, an expandable coating which, after vulcanization of the conveyor belt, has a pore structure provided to at least portions of the tension-member system. The sheets are formed from a polymeric material with resilient properties. In some cases, the tension-member system is composed of at least 50% by volume of steel, and may further include aramid structures.

In some aspects, the volume of the coating after vulcanization is from 30 to 5000% higher than prior to vulcanization. The coating may contain at least one of a blowing agent and/or microbeads. The coating may be provided to all or parts of central core strands of the cords of the tension-member system, and further, provided to all or parts of core strands of outer strands of the cords of the tension-member system.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
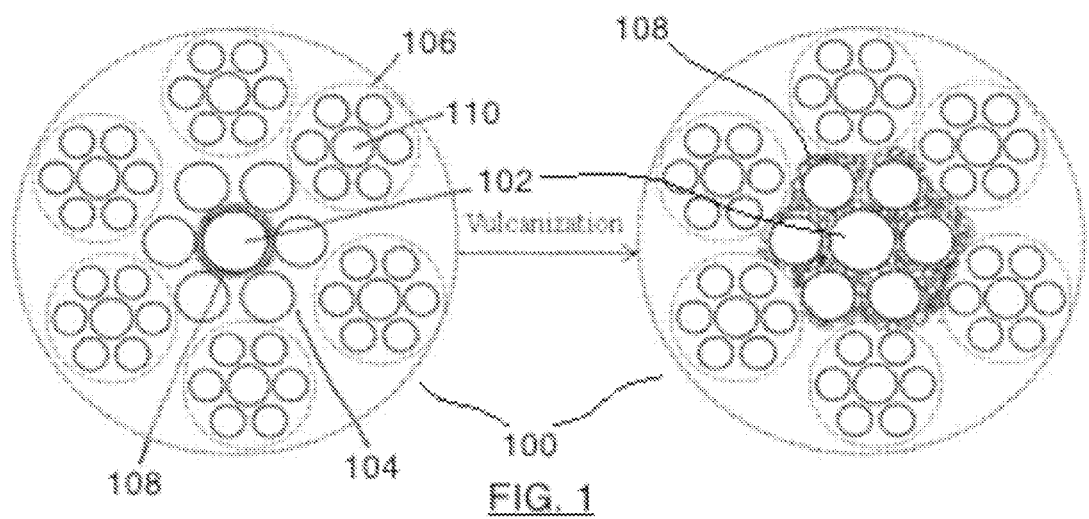
FIG. 1 illustrates a central core wire treated with an expandable coating in a cross-section view, in accordance with an aspect of the disclosure; and, FIG. 2 depicts a cord structure in a cross-section view, in accordance with the disclosure.

The following description of the variations is merely illustrative in nature and is in no way intended to limit the scope of the disclosure, its application, or uses. The description and examples are presented herein solely for the purpose of illustrating the various embodiments of the disclosure and should not be construed as a limitation to the scope and applicability of the disclosure. While the compositions of the present disclosure are described herein as comprising certain materials, it should be understood that the composition could optionally comprise two or more chemically different materials. In addition, the composition can also comprise some components other than the ones already cited. In the summary of the disclosure and this detailed description, each numerical value should be read once as modified by the term "about" (unless already expressly so modified), and then read again as not so modified unless otherwise indicated in context. Also, in the summary of the disclosure and this detailed description, it should be understood that a concentration or amount range listed or described as being useful, suitable, or the like, is intended that any and every concentration or amount within the range, including the end points, is to be considered as having been stated. For example, "a range of from 1 to 10" is to be read as indicating each and every possible number along the continuum between about 1 and about 10. Thus, even if specific data points within the range, or even no data points within the range, are explicitly identified or refer to only a few specific, it is to be understood that inventors appreciate and understand that any and all data points within the range are to be considered to have been specified, and that inventors had possession of the entire range and all points within the range.

Unless expressly stated to the contrary, "or" refers to an inclusive or and not to an exclusive or. For example, a condition A or B is satisfied by anyone of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of concepts according to the disclosure. This description should be read to include one or at least one and the singular also includes the plural unless otherwise stated.

The terminology and phraseology used herein is for descriptive purposes and should not be construed as limiting in scope. Language such as "including," "comprising," "having," "containing," or "involving," and variations thereof, is intended to be broad and encompass the subject matter listed thereafter, equivalents, and additional subject matter not recited.

Also, as used herein any references to "one embodiment" or "an embodiment" means that a particular element, feature, structure, or characteristic described in connection with the embodiment is included in at least one embodiment. The appearances of the phrase "in one embodiment" in various places in the specification are not necessarily referring to the same embodiment.

An object of the disclosure involves ensuring full rubberization of the cord in such a way that the number of available cavities is markedly reduced and transport or migration of liquids into the cord structure and especially within the cord structure can be prevented. This object is achieved in that the tension-member system is composed of a cord which in essence is composed of steel, where, prior to vulcanization of the conveyor belt, an expandable coating which, after vulcanization of the conveyor belt, has a pore structure, has been provided to all or parts of the tension-member system. It is preferable here that the pore structure has sealing properties, i.e. that the dimension of the pore structure is such that a pore structure having sealing properties is present in each of the cavities.

Expandable means that during vulcanization the coating undergoes a volume increase, which goes beyond the volume increase usually present during vulcanization. The volume of the coating after vulcanization is preferably from 30 to 5000%, very particularly preferably from 200 to 1000%, higher than prior to vulcanization. The volume increase here was determined under standard conditions, i.e. under naturally occurring conditions, without additional application of pressure, i.e. at atmospheric pressure.

"In essence composed of steel" means that at least 50% by volume of the cord must be composed of steel, but that it is also possible that a hybrid cord made of steel and of at least one other material is involved. This type of hybrid cord by way of example made of steel and aramid is described in WO 2012/079820 A1.

When this type of expandable coating is provided to all or parts of a cord, the heating procedure during vulcanization proceeds from outside, i.e. from the rubber side, toward the inside, i.e. toward the cord. The adhesive mixture situated outside of the coated cord therefore initially becomes flowable and penetrates, in particular by virtue of the pressure applied, to a certain degree into the cord. This procedure is known as exterior cord penetration. It permits only the full rubberization of relatively small cord diameters up to about 10 mm in an open cord structure.

After a time delay, the expandable coating then reacts, and this can be considered to be cord penetration from the inside toward the outside. The expandable coating expands, i.e. is blown, thus filling the remaining inner cavities and adhering to, or becoming adhesively bonded to, the cord surfaces of the wires. A particularly relevant point here is that the blowing process takes place first, and then after a time delay the hardening process takes place, e.g. via vulcanization. This gives a pore structure, which can also be described as honeycomb system made of resilient chambers, preventing further migration of liquids and other contaminants within the cord. Corrosion-prevention is thus optimized.

It is preferable that the outer sheet on the loadbearing side and on the drive side is in each case composed of at least one polymeric material with resilient properties. Rubbers can be involved here, as also can further plastic elastomers, e.g. polyurethane. It is preferable that the polymeric material is a rubber selected from the group consisting of natural rubber (NR) and/or butadiene rubber (BR) and/or chloroprene rubber (CR) and/or styrene-butadiene rubber (SBR) and/or nitrile rubber (NBR, HNBR) and/or butyl rubber (IIR) and/or ethylene-propylene rubber (EPM) and/or ethylene-propylene-diene rubber (EPDM) and/or polyacrylate rubber (ACM) and/or epichlorohydrin rubber (ECO) and/or chlorosulfonated polyethylene rubber (CSM) and/or silicone rubber (MVQ) and/or fluoro rubber (FPM).

The rubbers mentioned can be used here alone or in a blend. A material that has been of particular importance hitherto is CR, which features high flame resistance, weathering resistance, and aging resistance, in particular for conveyor belts used in underground mining. Other materials that have achieved relatively great importance in underground mining are NR, and also the abovementioned blends (DE 10 2009 043 904 A1).

The outer sheets can also take the form of sheeting or fabric, and the materials mentioned are likewise used here. It is particularly preferable that the sheeting is based on at least one fluoropolymer. This ensures additional optimized resistance to damage resulting from contact with other materials.

The two outer sheets can moreover comprise, alongside the rubber component, at least one crosslinking agent or one crosslinking system, comprising a crosslinking agent and an accelerator, and also mostly other mixture ingredients, in particular at least one filler and/or at least one processing aid and/or at least one aging retarder and/or at least one plasticizer and/or other additives (e.g. fibers, color pigments).

There can moreover also be the following components embedded into the outer sheet on the loadbearing side and/or the outer sheet on the drive side: conductor loops, transponders, barcodes, a polymer matrix into which detectable particles have been mixed, or other detectable elements.

The following can also have been provided for the conveyor belt: an additional part, for example an impellor part, a guide part, and also edge and sidewall profiles. Additional parts of this type are composed of a polymeric material (rubber, thermoplastic elastomer, thermoplastic), the bases of these being adhesively bonded and/or vulcanized to the surface of the resilient conveyor belt on the loadbearing side.

In order to prevent slitting of steel-cord conveyor belts, and also of conveyor belts with textile tension-member systems, these also use, embedded into the outer sheet on the loadbearing side and/or on the drive side, a transverse reinforcement system made of synthetic cords, for example made of polyamide (PA), or of thin steel cords, see inter alia WO 2008/034483 A1.

As already mentioned in the introduction, it is preferable that the conveyor belt also comprises at least one adhesive rubber mixture, intended to ensure adhesion between the outer sheets and the cords. This adhesive rubber mixture is often also known as adhesive mixture, core mixture or skim mixture. It is preferable that the adhesive mixture is based on at least one elastomer. The elastomer can involve rubbers, or else thermoplastic elastomers, for example polyurethane. However, it is preferable that this is a rubber selected from the group consisting of natural rubber (NR) and/or butadiene rubber (BR) and/or chloroprene rubber (CR) and/or styrene-butadiene rubber (SBR) and/or nitrile rubber (NBR, HNBR) and/or butyl rubber (IIR) and/or ethylene-propylene rubber (EPM) and/or ethylene-propylene-diene rubber (EPDM) and/or polyacrylate rubber (ACM) and/or epichlorohydrin rubber (ECO) and/or chlorosulfonated polyethylene rubber (CSM) and/or silicone rubber (MVQ) and/or fluoro rubber (FPM). The rubbers mentioned can be used here alone or in a blend. Mixtures based on SBR and/or NR and/or BR have particularly good suitability as adhesive mixture. The adhesive mixtures mostly also comprise at least one plasticizer and/or at least one solvent; by way of these it is generally possible to adjust the viscosity and/or adhesion or tack of the adhesive mixture.

The literature frequently makes a distinction between conveyor belts and transport belts. Conveyor belts are generally used for unconsolidated solid materials (for example coal, ore, sand, cement, etc.), whereas transport belts are usually used for unitized materials (packets, etc.). Conveyor belts are generally longer, wider, thicker and stronger than transport belts. However, non-specialist use of language often mixes the two concepts. The present invention is therefore suitable not only for conveyor belts but also for transport belts where these respectively use cords in essence composed of steel.

The qualitative and/or quantitative composition of the coating here, ignoring the required additives needed for the application, onto and/or into the cord, of the coating that can penetrate the cord, and the development of the pore structure, can be identical with or different from the composition of the adhesive mixture. In one particularly preferred embodiment, the qualitative and/or quantitative composition, in particular the qualitative composition, ignoring the above exceptions, is identical with the composition of the adhesive mixture. Complexity in the production process is thus only slightly increased.

The coating comprises at least one rubber. The rubber for the coating is selected from the group consisting of natural rubber (NR) and/or butadiene rubber (BR) and/or chloroprene rubber (CR) and/or styrene-butadiene rubber (SBR) and/or nitrile rubber (NBR, HNBR) and/or butyl rubber (IIR) and/or ethylene-propylene rubber (EPM) and/or ethylene-propylene-diene rubber (EPDM) and/or polyacrylate rubber (ACM) and/or polyurethane (PU) and/or epichlorohydrin rubber (ECO) and/or chlorosulfonated polyethylene rubber (CSM) and/or silicone rubber (MVQ) and/or fluoro rubber (FPM).

The rubbers mentioned can be used here alone or in a blend. The coating can moreover comprise the usual quantities of at least one filler. It is possible here to use any of the fillers known to the person skilled in the art, for example silica, carbon black, mica, carbon nanotubes, silicates, aluminum hydroxide, talc, chalk, etc.

It is also possible to use any of the other additives known to the person skilled in the art, for example crosslinking systems, pigments, plasticizers, anti-ozonants and aging retarders.

This pore structure can result from the use of chemical blowing agents and/or microbeads mixed into the coating. Either inorganic or organic compounds can be used as blowing agents. These usually involve pore-forming blowing gases, e.g. azo and diazo compounds which eliminate gases (e.g. $N_2$ or $CO_2$) when exposed to heat or catalysts, and thus permit pore formation. The blowing agents decompose here at a certain temperature during processing with formation of gas or in the case of addition of volatile solvents during polymerization or vulcanization. The microbeads are hollow beads (microspheres) with diameter in the µm range made of glass, phenolic resin, carbon or thermoplastic material. The microbeads are marketed in pre-expanded form or else in expandable form. In order that the desired volume increase of the coating can be achieved, it is preferable for the purposes of the present invention to use expandable microbeads which have been filled with a blowing agent and expand on heating. Microbeads of this type are marketed by way of example as Expancel® from Akzo Nobel.

In order to form a closed pore structure which has particularly good sealing properties it is preferable to add, to the coating, from 1 to 200% by weight of expandable microbeads, preferably from 5 to 100% by weight, and very particularly preferably from 10 to 80% by weight.

It is moreover also possible that the coating comprises solvents which serve to adjust the viscosity and thus flowability of the coating. Any of the solvents known to the person skilled in the art can be used as solvents, but it is preferable to use toluene and/or petroleum spirit and/or esters and/or ethers and/or alkanes, and/or terpene derivatives. These can be used individually or in combination.

The viscosity of the coating is preferably from 10 000 Pa s at 0.1 rotations per second to 0.01 Pa s at 800 rotations per second. It is particularly preferable that the viscosity is from 5000 Pa s at 0.01 rotations per second to 0.01 Pa s at 800 rotations per second. It is very particularly preferable that the viscosity is from 0.01 Pa s at 800 rotations per second to 0.1 Pa s at 800 rotations per second. The viscosity was determined with the aid of a Rheolab NC20 rotary viscometer from Physika, measurement system MK23, in accordance with DIN 53 019-1.

Any of the coating methods known to the person skilled in the art can be used to apply the coating to the cord.

As already mentioned in the introduction, an adhesive mixture has in essence two functions: it permits firstly adhesion to the steel cord and secondly full rubberization of the cord for purposes of sealing.

The cord for the conveyor belt is generally composed of a plurality of strands which in turn are composed of individual wires. The structures most commonly used are 7×7, with a cord made of 7 strands each composed of 7 wires, 1×19+7×7, with a core strand made of 19 individual wires and outer strands made of in each case wires, and 7×19, with a cord made of 7 strands, where each strand is composed of 19 wires.

The adhesion between steel and rubber is in essence provided by the contact of the adhesive mixture with the outer cord surfaces.

In one particularly preferred embodiment of the invention, therefore, the expandable coating is provided at least to the internal core strand, and during the vulcanization process this leads to the interior sealing of the cord, without any adverse effect on the outer adhesion of rubber to metal. Since new cavities (cord interior) are produced during the twisting of the cord, said core strand precoating must be capable of flowing into these cavities, and this is achieved via an appropriately adjusted viscosity of the coating solution during the coating process.

The expandable coating has a relatively low density after vulcanization, where appropriate with high gas content, and at the same time provides sealing. The coating is preferably applied in the form of thin layer to the core wire, e.g. via impregnation, any solvent present evaporates, and then the entire cord is structured in such a way that the location of the coated core wire is only in the interior of the cord.

When this cord is processed into a transport belt and vulcanized, the heating procedure in the press proceeds from the outside (elastomeric outer layer) toward the inside (cord). The adhesive rubberization present therefore first becomes flowable and flows into the outer cavities of the cord, and encloses these, and during the subsequent vulcanization process forms a secure bond between rubber and metal. After a time delay, the expandable coating then reacts in the cord interior, expands, thus fills the remaining inner cavities, and adheres on the wire surfaces in the interior of the cord. It is important here that the blowing takes place first and then, after a time delay, the hardening process, e.g. via vulcanization. An interior honeycomb system made of resilient chambers is thus produced, preventing further migration of water and other liquids or contaminants within the interior of the cord. Corrosion of the cord is thus prevented. It is advantageous here that the external regions of the resultant cord are free from the expandable coating and the adhesion between cord surface and adhesive rubber is not reduced by any pore structures which are formed by the expandable coating.

However, it is also possible that the expandable coating is provided to the surfaces of all of the strands of the cord, and not only to those of the core wire. A single coating is used here to achieve full sealing of the cord and to achieve the adhesion between outer layers and cord, so that a single operation is sufficient to achieve both objectives in the production process. In particular, as the number of strands twisted to give the entire cord increases, full rubberization by the prior art becomes more problematic, and it is therefore advantageous that the expandable coating has likewise also been provided to the core wires of the outer strands of the cord. This permits the use of compact steel cords with relatively large diameters so as to permit transportation of even greater loads of the type increasingly demanded by customers, and a general increase in the lifetime of conveyor belts.

It is possible therefore that only the central core strand has been coated, or that the central core strand and the core strand of the outer strands has been coated, or that the entire cord has been coated.

Working examples will now be used to illustrate the invention with reference to diagrams.

FIG. 1 shows the central core wire 102 of cord structure 100 treated with the expandable coating 102 (left-hand side of FIG. 1). The volume of the coating 102 increases during the subsequent vulcanization process and fills the cavities in the core strand 104 (right-hand side of FIG. 1).

Figure 2:
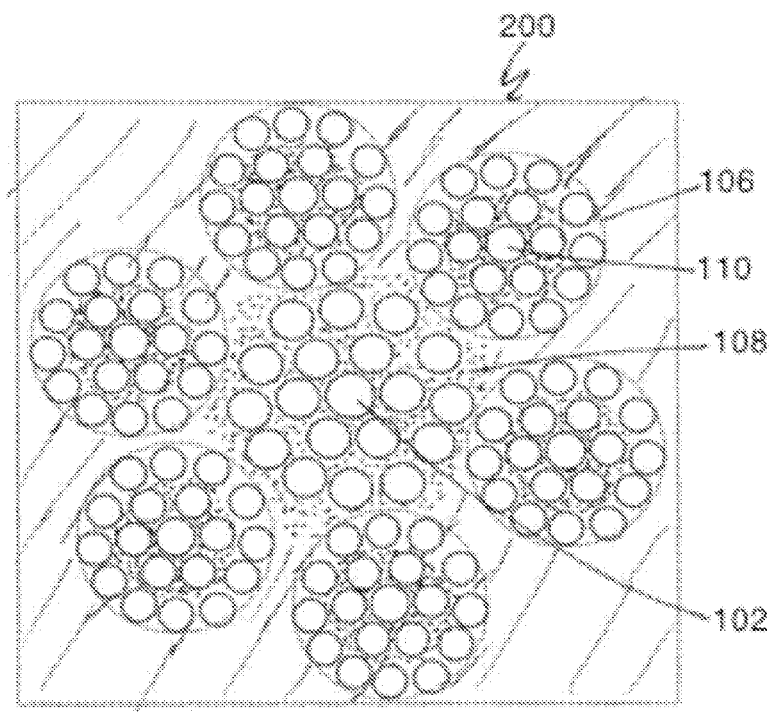

FIG. 2 shows a 7×19 cord structure as is present in sealed form at the end of the vulcanization process. The hatched area here represents the regions filled by the adhesive mixture penetrating from outside. The dotted regions indicate the expandable mixture 108 after volume increase during vulcanization.

KEY (PART OF THE DESCRIPTION)

100, 200=Cord
102=Central core wire of core strand
104=Core strand
106=Outer strand
108=Expandable coating
110=Core wire of outer strand The foregoing description of the embodiments has been provided for purposes of illustration and description. Example embodiments are provided so that this disclosure will be sufficiently thorough, and will convey the scope to those who are skilled in the art. Numerous specific details are set forth such as examples of specific components, devices, and methods, to provide a thorough understanding of embodiments of the disclosure, but are not intended to be exhaustive or to limit the disclosure. It will be appreciated that it is within the scope of the disclosure that individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Also, in some example embodiments, well-known processes, well-known device structures, and well-known technologies are not described in detail. Further, it will be readily apparent to those of skill in the art that in the design, manufacture, and operation of apparatus to achieve that described in the disclosure, variations in apparatus design, construction, condition, erosion of components, gaps between components may present, for example.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A conveyor belt comprising a first outer sheet disposed on a loadbearing side, a second outer sheet disposed on a drive side, and an embedded tension-member system in the form of cords running parallel in the longitudinal direction of the conveyor belt, wherein the tension-member system comprises steel and an adhesive rubber which prior to vulcanization of the conveyor belt and upon heating of the conveyor belt becomes flowable and flows into outer cavities of the cords, and forms a secure bond between rubber and metal during vulcanization of the conveyor belt, wherein the tension-member system further comprises prior to vulcanization of the conveyor belt, an expandable coating which, after vulcanization of the conveyor belt, has a pore structure provided to at least portions of the tension-member system which fills inner cavities of the cords, wherein the sheets comprise a polymeric material with resilient properties, and wherein the expandable coating comprises a gas which forms the pore structure which provides corrosion resistance to the cords.

2. The conveyor belt as claimed in claim 1, wherein volume of the coating after vulcanization is from 30 to 5000% higher than prior to vulcanization.

3. The conveyor belt as claimed in claim 1, wherein the coating comprises at least one blowing agent and/or microbeads.

4. The conveyor belt as claimed in claim 1, wherein the tension-member system is composed of at least 50% by volume of steel.

5. The conveyor belt as claimed in claim 1, wherein the coating has been provided to all or parts of central core strands of the cords of the tension-member system.

6. The conveyor belt as claimed in claim 1, wherein the coating has been provided to all or parts of central core strands and core strands of outer strands of the cords of the tension-member system.

* * * * *